United States Patent [19]

Klimezky

[11] 4,177,635

[45] Dec. 11, 1979

[54] SWIVEL LINK FOR A DUAL CHAIN CONVEYOR

[76] Inventor: Frank Klimezky, 3581 S. Ocean Blvd., South Palm Beach, Fla. 33460

[21] Appl. No.: 939,673

[22] Filed: Sep. 5, 1978

[51] Int. Cl.² ..................... F16G 13/06; B65G 17/00
[52] U.S. Cl. ......................................... 59/78; 74/246; 74/248; 74/258; 198/852
[58] Field of Search ..................... 59/78, 95; 198/852, 198/850, 851; 74/246, 250 R, 250 C, 251 R, 251 C, 252, 245 R, 248, 258

[56] References Cited

U.S. PATENT DOCUMENTS

| | | | |
|---|---|---|---|
| 565,844 | 8/1896 | Dodge | 74/251 C |
| 1,434,630 | 11/1922 | Rackham | 72/246 |
| 2,193,291 | 3/1940 | Marchins | 59/95 |
| 2,455,624 | 12/1948 | Tenety | 74/246 |
| 2,646,160 | 7/1953 | Michna | 74/246 |
| 2,766,635 | 10/1956 | Schwarzkopf | 74/246 |
| 2,778,236 | 1/1957 | Proctor | 74/246 |
| 3,392,819 | 7/1968 | Waite | 198/852 |

FOREIGN PATENT DOCUMENTS 2126348  1/1972  Fed. Rep. of Germany ........ 74/250 C

*Primary Examiner*—Francis S. Husar
*Assistant Examiner*—Gene P. Crosby
*Attorney, Agent, or Firm*—Barry L. Haley; Eugene F. Malin

[57] ABSTRACT

A swivel link for a dual chain conveyor which permits predetermined sections of a pair of endless chains to be rotated perpendicular to the longitudinal direction of movement of the chains. The dual chain is used as a conveyor for a load and the swivel link allows a work piece transported on the dual chain conveyor to be moved at a work station.

1 Claim, 4 Drawing Figures

U.S. Patent      Dec. 11, 1979      4,177,635
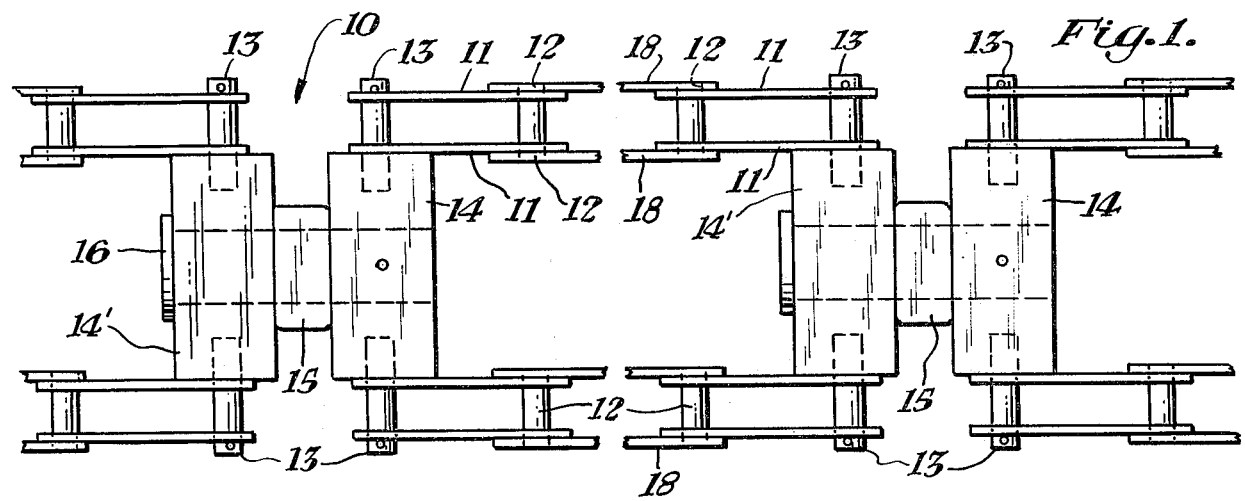
Fig. 1.
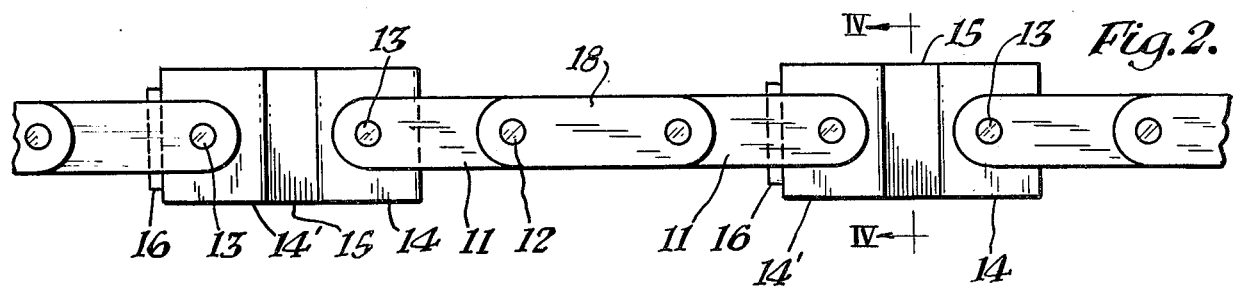
Fig. 2.
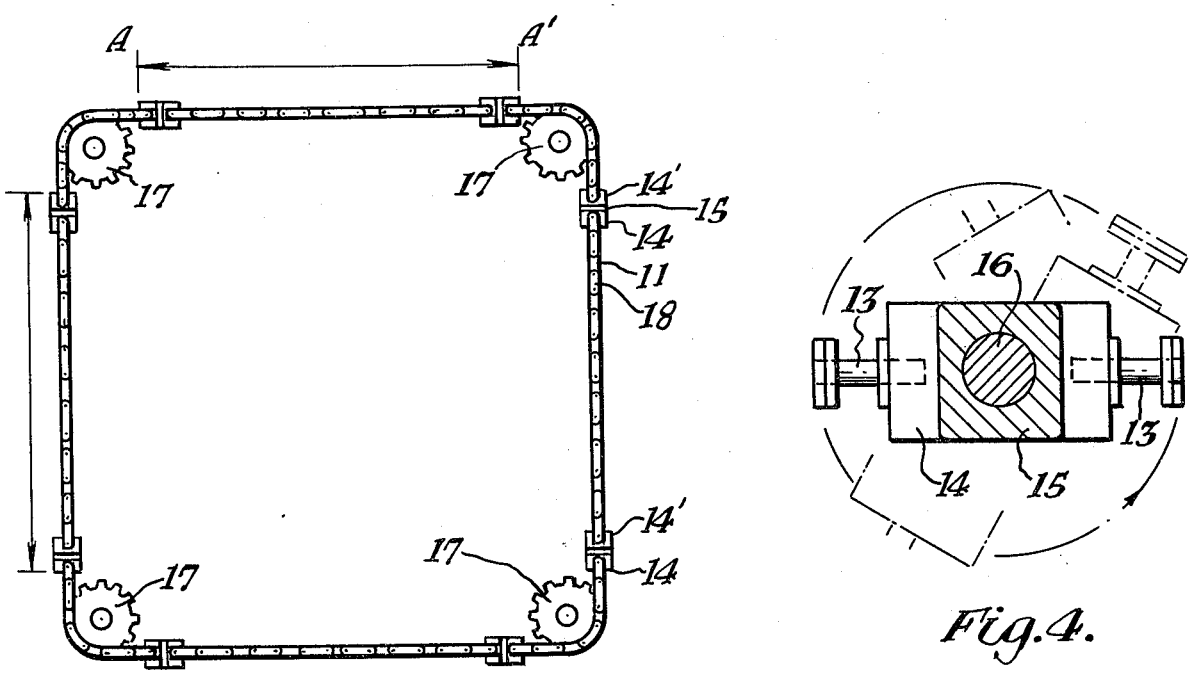
Fig. 3.
Fig. 4.

SWIVEL LINK FOR A DUAL CHAIN CONVEYOR

BACKGROUND OF THE INVENTION

This invention relates generally to chain link adaptors for use with endless chains being used to convey loads, and specifically to adaptors for predetermined links of chain which allow for load rotational movement perpendicular to the direction of travel of the chain.

It is well known to use dual chain conveyors for transporting loads during various industrial processes. Many times a particular work piece is transported by chain between various work stations where different functions are applied to the work piece. One of the problems in using chains in the past is that because of the fixed linkage requirements and the use of sprockets to drive the chains and the fact that each link has to provide movement to accommodate both sprocket and transport, the chain has not been totally useful in many different work applications.

The present invention provides for chain link swivel adaptors for a dual chain transport on an endless type conveyor in which predetermined sections of the chain may be rotated perpendicular to the direction of travel to specific angles for allowing additional or specific treatment of the work piece being transported on the chain.

BRIEF DESCRIPTION OF THE INVENTION

A device for connecting together sections of a dual chain transport, said device including first and second bodies each of said bodies being mounted between the dual chains, each body being connected to the chain on each side by a pair of chain pins. The bodies are connected by a swivel spacer and swivel pin which permits rotational, relative movement between the first and second body. The mounting pins which are connected to the chain link and the first and second body are spaced along the longitudinal direction of travel of the chain to be equal to the pitch distance between the chain links themselves.

A pair of transport chains are mounted laterally parallel and form endless conveyor chains upon which various work pieces may be supported. The sprocket and chain drive mechanism is essentially conventional and does not form a part of this invention. A predetermined length of the dual chain transport has mounted at each end a swivel adaptor. Thus the first and second body members which are moveable rotatably relative to each other are connected to separated ends of the endless chain which together separate the predetermined length of chain to be rotated from the main chain transport.

The first body is connected between the dual chain laterally to provide support between the chain and includes a rigid body having a central aperture and a pair of side apertures which receive pins disposed through each chain link on each side to firmly mount the first body between the chain sections laterally. The pin is also connected through the chain link at a position such that the pitch of the overall chain will not be altered. The second body is positioned on the chain transport and includes chain pins connected through the chain links and a rigid body having a central aperture and apertures for receiving the chain pins. When viewed longitudinally along the direction of chain movement, the pins of the first body are separated a distance equal to the pitch of the chain from the pins used to anchor the second body to the chain transport.

A swivel pin which has its longitudinal access parallel to that of the direction of movement of the chain is disposed through the aperture in the first body and anchored in the aperture in the second body. Each swivel pin includes a flanged head which acts as a stop to hold the swivel pin against the first body while allowing rotational movement therebetween. A spacer is positioned coaxially around a portion of the swivel pin and forms spacing between the first and second bodies to assure that the pitch distance of the chain is fixed.

In operation after the predetermined length chain which is to be rotated relative to the overall chain transport system has been selected and the swivel adaptors installed, the entire endless transport sytem may be then utilized in conjunction with various work stations to which work pieces are transported to perform functions which allow the predetermined section to be rotated to any predetermined angle at a particular work station. This may be accomplished by motors, cylinders or other type of devices which impart rotational motion to the work piece or load disposed on the transport chain.

It is an object of this invention to provide an improved transport system using a dual chain transport to allow rotational movement of a load positioned on a dual chain.

It is another object of this invention to increase the utility of a dual chain transport system allowing for additional treatment of work pieces.

In accordance with these and other objects which will be apparent hereinafter, the instant invention will now be described with particular reference to the accompanying drawings.

BRIEF DESCRIPTION OF THE DRAWINGS

FIG. 1 shows a top plan view of one of the swivel adaptors utilized in the instant invention.

FIG. 2 shows a side elevational view of the instant invention.

FIG. 3 shows a chain transport section in a side elevational view utilizing the instant invention.

FIG. 4 shows a cross-sectional view along line IV—IV of FIG. 2.

PREFERRED EMBODIMENT OF THE INVENTION

Referring now to the drawings and specifically FIG. 1, the instant invention is shown generally at 10 comprised of first and second swivel bodies 14 and 14' which are rigid bodies having a swivel pin 16 connected therethrough. The first and second bodies 14 and 14' are connected to the chain links 11 by chain pins 13 passed through the chain link 11 into the body holding the dual chains apart laterally while connecting the first and second bodies to ends of the dual chain transport. A spacer 15 is used to separate the first and second swivel bodies and are sized in conjunction with the body size such that the distance between the chain pins 13 when viewed along the direction of motion of the chain will be equal to the pitch of the other links of the chain which allows the swivel to pass over and between the sprocket teeth which drive each of the chains.

FIG. 2 shows the chain pins 13 as connected into the swivel adaptor and the space between the pitch distance of the chains. Outer links 18 on each chain are connected to the inner links 11 by pins 12. The pitch of each chain is the distance between pins 12. The distance between pins 13 that connect to swivel bodies 14 and 14' is equal to the distance between pins 12 and between each pin 12 and each pin 13.

FIG. 3 shows the system utilizing predetermined sections of chain such as A–A' as disposed in an endless conveyor between sprockets 17 to form an endless conveyor on the chain selected as predetermined links which may be treated. The swivel adaptors 14–14' are positioned between predetermined lengths of chain that may be rotated perpendicular to the direction of movement. Thus the sprockets 17 are driven and the chain which has a work load disposed on it at certain sections is moved to a respective work station. At the respective work station the load or the work piece contained thereon or a container having liquid or the like can then be rotated ninety degrees or to any other given angle relative to the chain transport direction such that the work piece may be dumped, treated or otherwise positioned to accomplish a specific function and then returned to its original position so that the transport mechanism can continue.

FIG. 4 shows the spacer 15, swivel body 14 and swivel pin 16.

The instant invention has been shown and described herein in what is considered to be the most practical and preferred embodiment. It is recognized, however, that departures may be made therefrom within the scope of the invention and that obvious modifications will occur to a person skilled in the art.

I claim:

1. In a dual chain conveyor of the endless type having a plurality of predetermined lengths of first chains and second chains mounted in laterally and axial alignment relationship and each of said lengths having leading and tailing ends; an adaptor comprising a first rigid body mounted between leading ends of each of said plurality of lengths of said first and second chains;

a second rigid body mounted between the trailing ends of each of said plurality of lengths of said first and second chains;

a swivel pin connecting each said first and second body of adjacent chain lengths allowing relative rotational movement between said first and second body, and a spacer positioned between each said first and second body mounted on said swivel pin whereby predetermined lengths of said dual chain may be rotated perpendicular to the direction of movement of said chain.

* * * * *